(12) United States Patent  
Bohaychuk et al.

(10) Patent No.: US 10,012,325 B2  
(45) Date of Patent: Jul. 3, 2018

(54) CAGE VALVE WITH FLOW TRIM FOR REDUCED PORT EROSION

(71) Applicant: Master Flo Valve Inc., Edmonton (CA)

(72) Inventors: Larry J. Bohaychuk, Ardrossan (CA); Daniel Harlen Williams, Spring, TX (US); Cody Ryan Reynolds, Klein, TX (US); Anwar Abdul Sleiman, Edmonton (CA)

(73) Assignee: Master Flo Valve Inc., Edmonton (CA)

( * ) Notice: Subject to any disclaimer, the term of this patent is extended or adjusted under 35 U.S.C. 154(b) by 0 days.

(21) Appl. No.: 15/288,292

(22) Filed: Oct. 7, 2016

(65) Prior Publication Data

US 2017/0102084 A1    Apr. 13, 2017

Related U.S. Application Data

(60) Provisional application No. 62/239,668, filed on Oct. 9, 2015.

(51) Int. Cl.
*F16K 25/04* (2006.01)
*F16K 11/07* (2006.01)
(Continued)

(52) U.S. Cl.
CPC .......... *F16K 25/04* (2013.01); *F16K 11/0716* (2013.01); *F16K 25/005* (2013.01);
(Continued)

(58) Field of Classification Search
CPC ........ F16K 25/04; F16K 11/0716; F16K 3/24; F16K 27/041; Y10T 137/86759;
(Continued)

(56) References Cited

U.S. PATENT DOCUMENTS 4,103,702 A * 8/1978 Duthion .................... F16K 3/26  
    137/375  
4,236,547 A * 12/1980 Harasewych ............. F16K 3/24  
    137/243

(Continued)

FOREIGN PATENT DOCUMENTS

| CA | 2476813 | 6/2008 |
| EP | 0520566 | 3/1996 |
| WO | WO2011088548 | 7/2011 |

OTHER PUBLICATIONS

Search Report corresponding to United Kingdom Patent Application No. 1617045.8, dated Feb. 13, 2017.

*Primary Examiner* — Matthew W Jellett  
*Assistant Examiner* — Christopher Ballman  
(74) *Attorney, Agent, or Firm* — Leydig, Voit & Mayer, Ltd.

(57) ABSTRACT

A valve, and tubular cage component for a valve, in which the tubular cage is formed such that at least a ported portion between the ends of the cage includes a tubular outer cage member formed from a metal material, and a tubular inner cage member formed from a wear resistant material. The inner cage member and the outer cage member are concentrically aligned and have a length to span at least the ported portion. Some or all of the flow ports in the ported portion include a port insert which includes a port sleeve formed from a wear resistant material such that the port sleeve extends at least over the metal material of the outer cage member at the flow port.

15 Claims, 9 Drawing Sheets

(51) Int. Cl.
  *F16K 25/00* (2006.01)
  *F16K 27/04* (2006.01)
  *F16K 3/24* (2006.01)
  *E21B 34/02* (2006.01)
  *E21B 34/04* (2006.01)

(52) U.S. Cl.
  CPC ............... *E21B 34/02* (2013.01); *E21B 34/04* (2013.01); *F16K 3/24* (2013.01); *F16K 27/041* (2013.01); *Y10T 29/49405* (2015.01); *Y10T 137/7036* (2015.04); *Y10T 137/7668* (2015.04); *Y10T 137/86734* (2015.04); *Y10T 137/86759* (2015.04)

(58) Field of Classification Search
  CPC ....... Y10T 137/7036; Y10T 137/86734; Y10T 137/7668; Y10T 29/49405
  See application file for complete search history.

(56) References Cited

U.S. PATENT DOCUMENTS

| | | | |
|---|---|---|---|
| 4,471,810 A * | 9/1984 | Muchow | F16K 39/04 137/625.37 |
| 4,540,022 A | 9/1985 | Cove | |
| 4,569,370 A | 2/1986 | Witt | |
| 4,679,592 A * | 7/1987 | Lamb | F16K 47/04 137/625.33 |
| 4,971,099 A * | 11/1990 | Cyvas | E21B 34/02 137/270 |
| 5,018,575 A * | 5/1991 | Parsons | E21B 17/1085 166/242.4 |
| 5,086,808 A * | 2/1992 | Pettus | E21B 34/02 137/625.3 |
| 5,246,035 A * | 9/1993 | Skyllingstad | E21B 34/02 137/625.31 |
| 5,419,371 A * | 5/1995 | Berchem | E21B 43/12 138/109 |
| 5,431,188 A | 7/1995 | Cove | |
| 6,085,787 A * | 7/2000 | Kivipelto | F16K 5/0421 137/625.3 |
| 6,105,614 A | 8/2000 | Bohaychuk et al. | |
| 6,782,949 B2 | 8/2004 | Cove et al. | |
| 7,426,938 B2 | 9/2008 | Bohaychuk et al. | |
| 7,934,437 B2 * | 5/2011 | Biester | F16K 31/05 251/129.11 |
| 8,297,592 B2 | 10/2012 | McGuire et al. | |
| 8,371,333 B2 | 2/2013 | Bohaychuk | |
| 8,490,652 B2 | 7/2013 | Bohaychuk et al. | |
| 8,561,729 B2 * | 10/2013 | King | E21B 7/20 175/398 |
| 9,534,603 B2 * | 1/2017 | St. John | F04D 13/10 |
| 2010/0288389 A1 | 11/2010 | Hopper et al. | |

* cited by examiner

CAGE VALVE WITH FLOW TRIM FOR REDUCED PORT EROSION

CROSS REFERENCE TO RELATED APPLICATIONS

This application claims priority from U.S. Provisional Patent Application No. 62/239,668 filed Oct. 9, 2015, which is incorporated by reference herein to the extent that there is no inconsistency with the present disclosure.

FIELD OF THE INVENTION

This invention relates to a cage valve having a cage component for reduced erosion and improved fracture resistance, and to a cage component for same.

BACKGROUND

A choke valve is a throttling device commonly used as part of an oil or gas field wellhead to reduce the pressure of the fluid flowing through the valve. A choke valve is placed on the production "tree" of an oil or gas wellhead assembly to control the flow of produced fluid from a reservoir into the production flow line, and is used on wellheads located on land and offshore, as well as on wellheads located beneath the surface of the ocean (sub-sea). Examples of choke valves used in oil and gas fields are shown in U.S. Pat. No. 4,540,022, issued Sep. 10, 1985, to Cove and U.S. Pat. No. 5,431,188, issued Jul. 11, 1995 to Cove. Both patents are commonly owned by the applicant of this application, Master Flo Valve, Inc.

In general, choke valves include:

a valve body having an axial bore, a body inlet (also termed inlet bore) which is typically oriented as a side outlet to the axial bore, and a body outlet (also termed end outlet or outlet bore) which is aligned with the axial bore;

a "flow trim" mounted in the bore between the inlet and outlet, for throttling the fluid flow moving through the body; and biasing members such as a stem and bonnet assembly for actuating the flow trim to open and close the choke valve, and for closing the upper end of the axial bore remote from the outlet.

There are four main types of flow trim commonly used in commercial chokes, each of which includes a port-defining member forming one or more flow ports, a movable flow control member for throttling the flow ports, and seals to implement total shut-off. These four types of flow trim can be characterized as follows:

(1) a needle and seat flow trim comprising a tapered annular seat fixed in the valve body and a movable tapered internal plug for throttling and sealing in conjunction with the seat surface;

(2) a multiple-port disc flow trim, having a fixed ported disc mounted in the valve body and a rotatable ported disc, contiguous therewith, that can be turned to cause the two sets of ports to move into or out of register, for throttling and shut-off;

(3) a cage with internal plug flow trim, including a tubular, stationary cylindrical cage, fixed in the valve body and having ports in its side wall, and an internal plug movable axially through the bore of the cage to open or close the ports. Shut-off is generally accomplished with a taper on the leading edge of the plug, which seats on a taper carried by the cage or body downstream of the ports; and (4) a cage with external sleeve flow trim, including a tubular stationary cylindrical cage having ports in its side wall and a hollow cylindrical external sleeve (also termed external flow collar) that slides axially over the cage to open and close the ports. The shut-off is accomplished with the leading edge of the sleeve contacting an annular seat carried by the valve body or cage.

In each of the above, the flow trim is positioned within the choke valve at the intersection of the choke valve's inlet and outlet. In the latter two types of valves, termed "cage valves", the flow trim includes the tubular, stationary cylinder referred to as a "cage", positioned transverse to the inlet and having its bore axially aligned with the outlet. The cage has one or more restrictive flow ports extending through its sidewall. For cage valves, flow through the ports of the cage is controlled by a flow control member which is either an internal plug component, or an external sleeve/flow collar component. Fluid enters the cage from the choke valve inlet, passes through the flow ports and changes direction to leave the cage bore through the valve outlet.

A problem that has produced many production interruptions both with surface and sub-sea facilities is the failure of valve trim due to fracture and cracking. The common cause of this fracture is foreign debris moving through the flow line into the valve with sufficient mass and velocity to damage or fracture the valve trim. High vibration and/or excessive side loads may also result in fracture of the flow trim. Fractures or cracking of the flow trim may be extreme, causing catastrophic failure of the choke valve, which results in over pressurization of the downstream equipment or damage to the well formation due to excessive flow.

Choke valve flow trim components are typically manufactured from hardened, high wear material such as a tungsten carbide material, while the valve body is formed of softer material, typically steel. The steel body is machined in the course of fabrication and must cope with stresses, and thus is manufactured from a relatively ductile steel. The flow trim however has harder surfaces. Typically the cage component of the flow trim is formed of tungsten carbide, and depending on the type of cage valve, the internal plug is formed of tungsten carbide, or a tungsten carbide liner is shrink-fitted as a liner in the flow collar. This is important because the flow trim is positioned at the bend of the "L", where it is exposed to, and temporarily contains, the fluid flow when it is accelerated, is changing direction, and is in a turbulent state. Erosion of the flow trim may be extreme, causing catastrophic failure of the choke valve, which results in over pressurization of the downstream equipment or damage to the well formation due to excessive flow.

The tungsten carbide material in the flow trim is a powder metallurgy product where tungsten in the concentration of about 85-95% is bonded within a matrix with a binder material, typically nickel, cobalt, molybdenum, chromium or a combination of these elements in the concentration of about 5-15%. This produces a material that is very hard by nature to prevent or delay the effects of erosion to the valve trim. The hardness of the trim components is typically in the Rockwell Ra 90-95 range. As one increases the hardness of the tungsten carbide material (generally by decreasing binder materials in the matrix), the wear values are dramatically improved. However, as the hardness level of tungsten carbide is increased, the susceptibility to fracture also increases.

There have been a number of attempts at solutions to mitigate the damage caused by foreign debris; however, many of these attempts have resulted in a trade off to the potential wear capabilities of the choke trim. One approach is to manufacture the flow trim from tungsten carbide grades that have a higher percentage of binder material, typically nickel, cobalt, molybdenum, chromium or a combination of these elements. Concentrations in the order of 12-15% have resulted in improved toughness of the tungsten carbide matrix; however, the volume of binder in the concentration results in a matrix with lower hardness and consequently substandard erosion characteristics. This results in rapid wear to the flow trim resulting in costly production interruptions for valve maintenance or in the sub-sea applications, a high valve retrieval cost to facilitate maintenance.

Another approach is to encase the tungsten carbide material with a stainless steel carrier to absorb some of the energy from the foreign particle on impact and to protect the brittle tungsten carbide from direct impact. This approach has been used for the cage with internal plug flow trim, for example as shown in the cage component of U.S. Patent Publication 2010/0288389 A1, to Hopper et al., and assigned to Cameron International Corporation. The cage itself is a stainless steel carrier into which an internal tungsten carbide insert is press fit. The plug may also be formed from tungsten carbide. This design works well for the cage/plug flow trim, where the wear is to the internal bore of the cage. However, the internal plug design has proven inferior for erosion resistance when compared to the external sleeve (flow collar) choke valve designs. In the latter type of choke valves, the wear is extreme at the port areas between the external sleeve and the internal cage. For this reason a hard material such as tungsten carbide must be used at the interface between the cage and the external sleeve. Using a steel sleeve over a tungsten carbide insert, as is done with the cage with internal plug design, would result in accelerated erosion for cage valves of the external sleeve choke valve design.

Examples of such choke valves of the external sleeve cage valve design are shown in, for instance, U.S. Pat. No. 4,540,022, issued Sep. 10, 1985, to Cove et al., and U.S. Pat. No. 6,105,614, issued Aug. 22, 2000 to Bohaychuk et al. A choke valve including an external sleeve flow trim in sub-sea applications is shown in U.S. Pat. No. 6,782,949 to Cove et al. These patents describe the beneficial characteristics of the external sleeve (flow collar) design in erosion control, valve outlet erosion protection, seating integrity, and fluid energy control features. U.S. Pat. No. 8,490,652 to Bohaychuk et al., issued Jul. 23, 2013, discloses a cage component formed with tubular inner and outer cage members bonded together at an interface such as by brazing. This cage component can be used to reduce fracturing as the outer cage member may be formed from grade of tungsten carbide for fracture resistance, while the inner cage component may be formed from a harder, erosion resistant grade of tungsten carbide.

U.S. Pat. No. 7,426,938, issued Sep. 23, 2008 to Bohaychuk et al. relates to a choke valve with external sleeve and cage flow trim designed for fracture prevention. The valve includes a protective tubular sleeve, or insert cartridge in which the side ports are located to overlap with the intersection of axes of the inlet and outlet bores in a manner to avoid direct impingement of fluid along the axis of the inlet bore. In the cage, at least a pair of main flow ports are located to overlap with the intersection of the axes of the inlet and outlet bores, and are aligned with the side ports of the tubular sleeve or cartridge to communicate directly with the side ports. In this manner fluid enters the choke valve through the inlet bore and passes through the main flow ports at reduced pressure and continues out through the outlet bore, without direct impingement on the side wall of the flow trim components.

Figure 1:
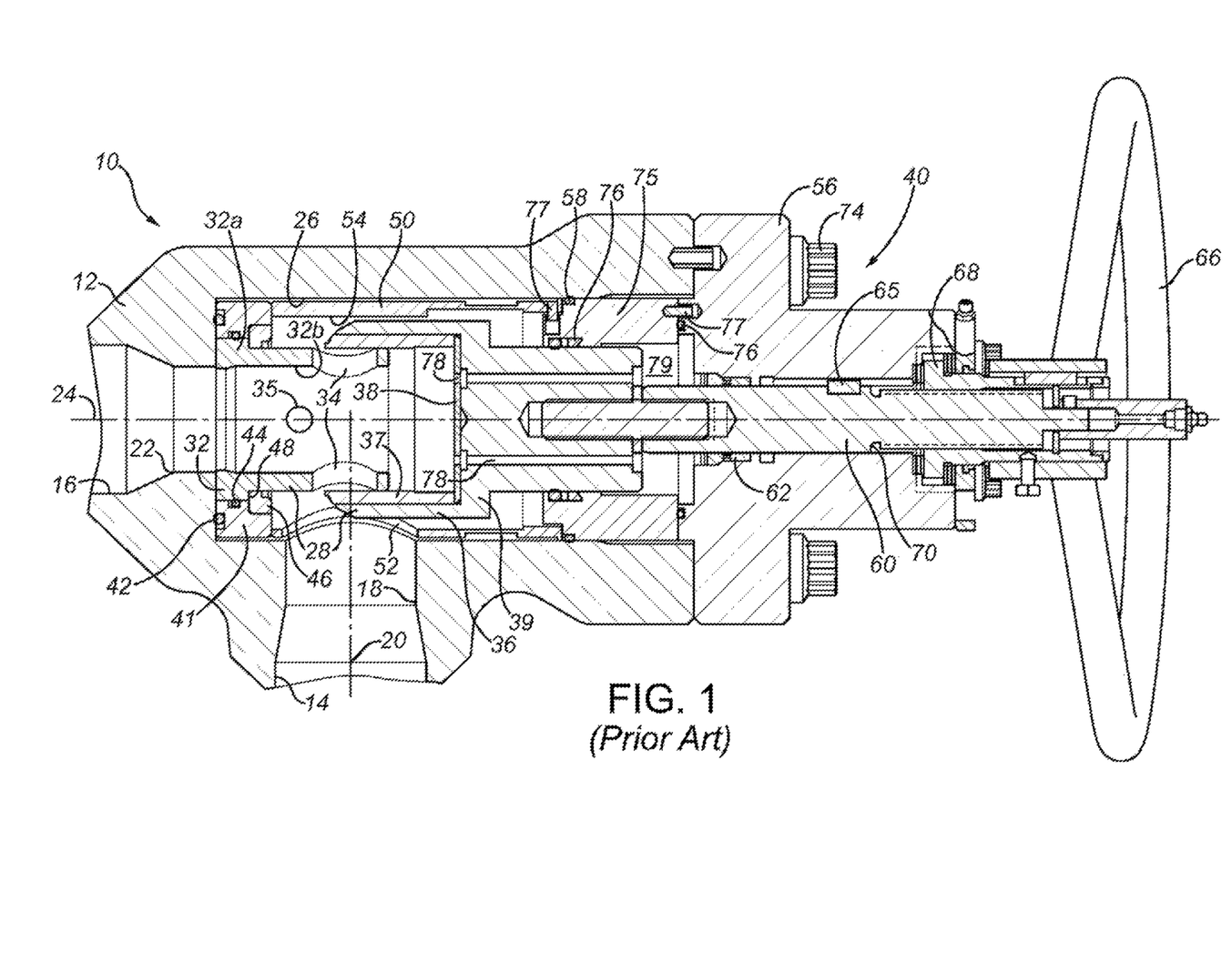
FIG. 1 is a side sectional view of a choke valve of the prior art for use as a surface choke valve, and showing the external flow collar of the flow trim in the partially open position wherein the main flow ports of the inner tubular cage component are partially uncovered. The valve body is partially cut away at the inlet bore and outlet bore to better illustrate the valve internals.

FIG. 1 shows a typical prior art choke valve in which the flow trim includes an external tubular throttling sleeve (flow collar) that slides over the cage. The sleeve acts to reduce or increase the area of the flow ports. An actuator, such as a threaded stem assembly, is provided to bias the sleeve back and forth along the cage. The rate that fluid passes through the flow trim is dependent on the relative position of the sleeve on the cage and the amount of port area that is revealed by the sleeve.

Figure 2:
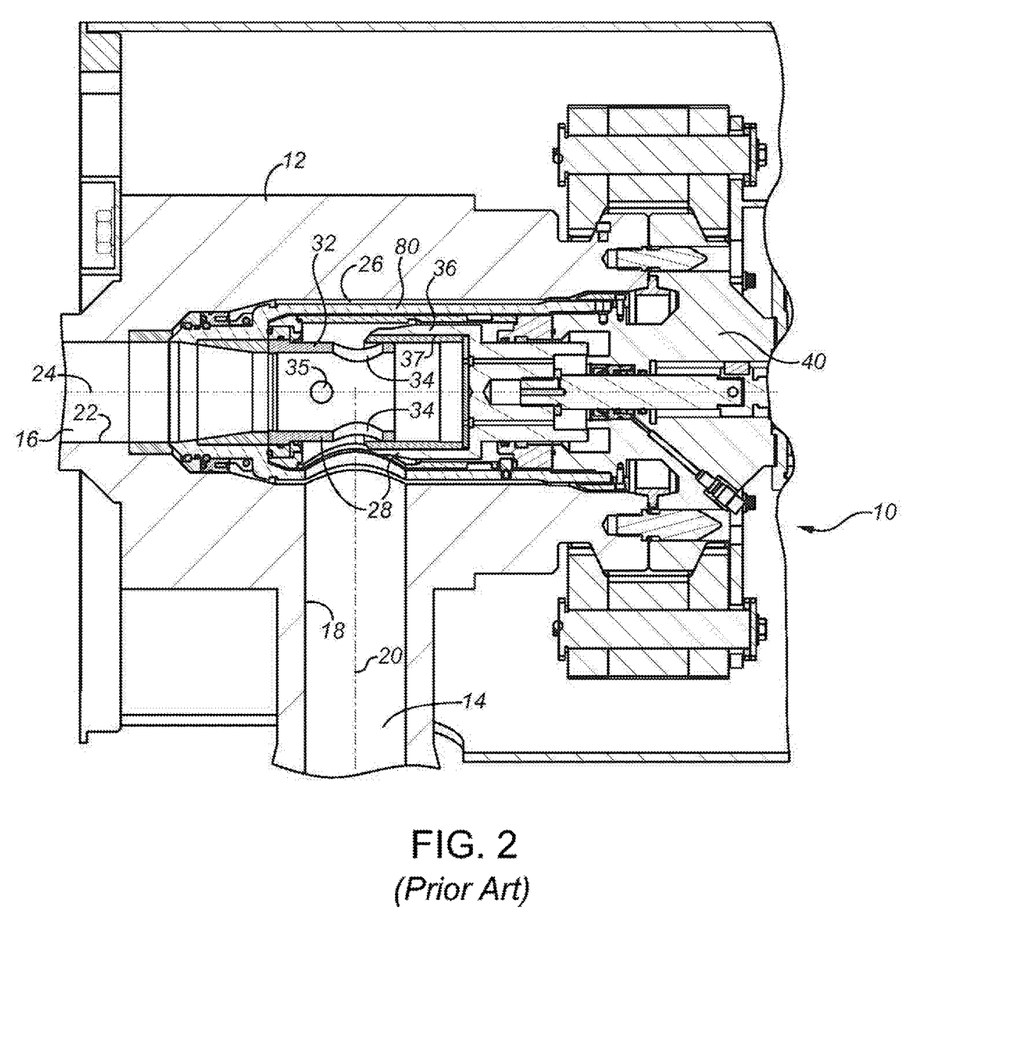
FIG. 2 is a side sectional view of another prior art choke valve with flow trim of the external sleeve internal cage design, but designed for a sub-sea wellhead. In sub-sea wellheads, maintenance cannot be performed manually. An unmanned, remotely operated vehicle, referred to as an "ROV", is used to approach the wellhead and carry out maintenance functions. To aid in servicing sub-sea choke valves, such choke valves have their internal components, including the flow trim, assembled into a modular sub-assembly. The sub-assembly is referred to as an "insert assembly" and is inserted into the choke valve body and clamped into position. The valve is shown in a partially cut away view to better illustrate the valve internals.

In sub-sea wellheads, maintenance cannot be performed manually. An unmanned, remotely operated vehicle, referred to as an "ROV", is used to approach the wellhead and carry out maintenance functions. To aid in servicing sub-sea choke valves, such choke valves have their internal components, including the flow trim, assembled into a modular sub-assembly. The sub-assembly is referred to as an "insert assembly" and is inserted into the choke valve body and clamped into position. FIG. 2 shows a typical prior art sub-sea choke valve with flow trim of the external throttling sleeve (flow collar) type.

SUMMARY

In some embodiments, there is provided a valve having a fluid flow path extending therethrough which is to be restricted or closed, including a hollow valve body assembly having an inlet bore and an outlet bore substantially at right angles and a main bore which is an extension of the outlet bore and which communicates with the inlet bore, and a flow trim positioned in the main bore. The flow trim includes a stationary tubular cage having a side wall, and an external cylindrical flow collar adapted for sliding movement along the side wall of the cage, the side wall of the cage forming an internal bore aligned with the outlet bore and having a ported portion between its ends formed with one or more flow ports. The external flow collar is adapted for movement between a closed position, wherein the one or more flow ports are fully covered by the external flow collar, and an open position, wherein each of the flow ports is fully or partially uncovered by the external flow collar, whereby fluid may enter the valve through the inlet bore, pass through the one or more flow ports at reduced pressure and continue through the outlet bore. The valve also includes a bonnet disengagably connected with, and closing, an upper end of the valve body and a stem for biasing the external flow collar over the one or more flow ports. The tubular cage is formed such that at least the ported portion includes a tubular outer cage member formed from a metal material and a tubular inner cage member formed from a wear resistant material, the inner cage member and the outer cage member being concentrically aligned and having a length to span at least the ported portion. Some or all of the one or more flow ports include a port insert comprising a port sleeve formed from a wear resistant material such that the port sleeve extends at least across the metal material of the outer cage member at the one or more flow ports.

In some embodiments, the port sleeve is seated against a seat shoulder extending into the one or more flow ports and formed in the inner cage member at the port opening into an inner bore of the inner cage member. In some embodiments, the port sleeve is press or shrink fitted in the one or more flow ports, while in other embodiments the port sleeve is welded or brazed in the one or more flow ports, or the port sleeve is held with the use of a cement or and adhesive, such as an epoxy adhesive.

In some embodiments the inner and outer cage members are coextensive along their entire lengths and are joined together by press or shrink fitting, or by welding.

The inner cage member and the port sleeves of some embodiments are formed from a hard ceramic or tungsten carbide material, preferably tungsten carbide, while the outer cage member is formed from steel, stainless steel or a metal alloy, preferably stainless steel.

In some embodiments, the one or more flow ports may be arranged on the cage component as a single main flow port, one or more pairs of diametrically opposed main flow ports, or as a multi-port cage, with a plurality of main flow ports circumferentially spaced in the ported portion of the cage. These embodiments may additionally include one or more secondary flow ports of smaller diameter spaced toward the outlet bore end of the cage.

Also provided are components of the valve, including the cage component. The valve may be adapted as a removable insert assembly for sub-sea applications.

BRIEF DESCRIPTION OF THE DRAWINGS

FIG. 3 is a side sectional view of one embodiment of the tubular cage component of the flow trim adapted for either type of flow trim (i.e., flow trim of FIG. 1 or FIG. 2), formed with an outer metal cage member, such as stainless steel, and an inner wear resistant cage member, such as tungsten carbide, shrink fitted within the outer cage member. The outer and inner cage members are co-extensive, that is the inner cage member extends along the full length of the outer steel cage member. Each of the outer and inner cage members are formed with a pair of diametrically opposed main flow ports and a pair of smaller diameter, diametrically opposed secondary flow ports. The flow ports are aligned through ported portion of the cage members when the inner and outer cage members are assembled. Each of the main and secondary flow ports are shrink fitted with a port insert which includes a seated port sleeve of a hardened, wear resistant material such as tungsten carbide.

DETAILED DESCRIPTION OF THE INVENTION

As used herein and in the claims, the word "comprising" is used in its non-limiting sense to mean that items following the word in the sentence are included and that items not specifically mentioned are not excluded. The use of the indefinite article "a" in the claims before an element means that one of the elements is specified, but does not specifically exclude others of the elements being present, unless the context clearly requires that there be one and only one of the elements.

The flow trim and cage component has broad application in control valves which use a cage component in the flow trim. The flow trim and cage component have broad application in control valves of the external sleeve (flow collar) and inner cage valve design, and not merely in the choke valves of the type illustrated in FIGS. 1 and 2. For example, the cage component may be adapted for use with other known external sleeve inner cage valves, for example cage valves in which the cage component is fitted at or into the outlet of the valve, for example by threading. The cage component may be adapted for use in external sleeve inner cage valves in which the cage component has a single flow port, pairs of diametrically opposed flow ports, or a plurality of flow ports as in a multi-ported valve, with a plurality of flow ports (same or differently sized) arranged circumferentially around the ported portion of the cage component. As well, the flow trim components may be modified for a cage valve of the internal plug design, wherein the external flow collar is replaced by an internal plug. In the description which follows, the cage component is described as being adapted for flow trim of the type shown in FIGS. 1 and 3, however, this description is illustrative only, and the claims which follow should not be interpreted as being limited to this valve.

Each of FIGS. 1 and 2 show a choke valve which is a cage valve of a external sleeve inner cage valve type. The valve is generally shown at 10, and includes a hollow valve body 12, a body side inlet 14 and a body outlet 16. The hollow valve body 12 forms a bore which extends therethrough providing side inlet bore 18 having an inlet bore axis 20 (centre axis), a bottom outlet bore 22 having outlet bore axis 24 (centre axis). The side inlet bore 18 and the bottom outlet bore 22 intersect at right angles (i.e., are generally T-shaped), forming a main bore 26 at the intersection. The main bore 26 is an extension of the bottom outlet bore 22, but also communicates with the side inlet bore 18. FIG. 2 shows a somewhat similar valve designed for sub-sea applications, with a removable insert assembly for remote controlled maintenance. While the above main valve parts are common to both valves in FIGS. 1 and 2, the description below is adapted to describe the valve of FIG. 1 in greater detail. While the above main valve parts are common to both types of valves, the description below is adapted to describe the valve of FIG. 1 in greater detail.

Flow trim components 28 are shown to be located in the main bore 26, including a stationary cage component 32 (herein termed cage) which is tubular and substantially open-ended, and an external throttling cylindrical sleeve (herein also termed flow collar) 36 adapted to slide along the outer side wall of the upstream end of the cage 32. The external flow collar 36 is closed at its upper end (upstream end, opposite the outlet bore 18) by an end plate 38. Typically, the flow collar 36 includes a steel exterior collar 39 into which is press fit an inner liner 37, including end plate 38, formed of hardened, erosion resistant material, such as tungsten carbide. The cage 32 has a side wall 32a which forms an internal bore 32b that communicates with, and is substantially aligned with, the outlet bore 22. The side wall 32a of the cage 32 also forms one or more flow ports, shown as being arranged as at least a pair of diametrically opposed main flow ports 34. Alternatively, as noted above, a plurality of circumferentially spaced flow ports may be present. Still further alternatively, a multiport cage with a plurality of ports, for example 16 ports, spaced around the ported area of the cage, may be provided. The cage side wall 32a may also be formed with at least a pair of diametrically opposed smaller, secondary flow ports 35. The secondary flow ports 35 have a smaller diameter than that of the main flow ports 34, and are positioned with their axis (i.e., an axis through the midpoint of the ports) rotated or offset by 90° from the axis of the main flow ports 34. The secondary ports 35 are positioned closer to the body outlet 16 than are the main flow ports 34. The main flow ports 34, being larger in diameter, collectively accommodate a majority (i.e., more than 50%) of the fluid flow from the inlet 14. Preferably, the main flow ports 34 are arranged as diametrically opposed pairs, such as 1, 2 or 3 pairs. The main flow ports 34 may be circumferentially spaced and circumferentially aligned on the cage 32 (i.e., the midpoints of the ports 34 are equally spaced in a circle around the circumference of the cage 32). As well, the main flow ports may be located to overlap the intersection of the centre axes 20, 24 of the body side inlet bore 18 and the body outlet bore 22. As well, at least one pair of the one or more pairs of the diametrically opposed main flow ports 34 may be arranged such that a line through a midpoint of the diametrically opposed main flow ports 34 is parallel to a centre axis 20 of the inlet bore 18.

The flow collar 36 is connected to a stem/bonnet assembly 40 for closing the upper end of the valve body 12 (i.e., the end opposite the outlet 16) and for advancing or withdrawing the flow collar 36 to slide across the ports 34, 35 to close them or open them as described below. The flow trim components 28 are preferably made of an erosion resistant hard material such as tungsten carbide.

The main bore 26 is formed to be larger in diameter than the outlet bore 22 in order to house, seat and seal the flow trim components 28 therein. A cylindrical seat member 41 is positioned at the lower end of the main bore 26. The seat member 41 is sealed to the valve body 12 in the main bore 26 with seat seal 42, and to the cage 32 with cage seal 44. The stationary cage 32 is held at its lower end within the inner diameter of the seat member 41. A seat insert member 46 is seated in the inside diameter of seat member 41. This seat insert member 46 is preferably formed of erosion resistant material such as tungsten carbide and serves multiple purposes. The seat insert member 46 protrudes inwardly to the cage 32 above a widened retaining shoulder 48 of the cage 32, thereby retaining the cage 32 within the main bore 26. As well, the seat insert member 46 forms a seat for the flow collar 36, when the flow collar 36 is in the fully closed position covering the main and secondary flow ports 34, 35. A tubular retaining sleeve 50 is preferably positioned in the main bore 26 between the seat member 41 and the bonnet 56. The flow trim 28 is positioned within the retaining sleeve 50. The retaining sleeve 50 extends transversely over the inlet bore 18, and has its bore 54 aligned with the outlet axis 24. The sleeve 50 includes at least one sleeve side port 52 into the sleeve bore 54, the side port 52 preferably being aligned with the inlet bore 18. In alternate embodiments, the sleeve side port 52 and main flow ports 34 may be offset relative to the inlet bore 18 for fracture prevention from debris moving down the inlet, as is described in U.S. Pat. No. 7,426,938 to Bohaychuk et al. In still further embodiments, the tubular retaining sleeve 50 may be omitted and the cage component may be held at or within the outlet bore 22, for example by threading.

The stem/bonnet assembly 40 is shown to include a stationary bonnet member 56 extending into the main bore 26, and carrying bonnet-body seal components 58. Housed within the bonnet member 56 is threaded stem member 60. The stem 60 and bonnet 56 are sealed through stem-bonnet seal components 62. The stem 60 is designed for axial movement, the result of rotational movement of the upper stem nut assembly 68 on an upper threaded section of the stem 60, initiated for example by rotating the handle assembly 66 at its upper end. The stem 60 is connected or fastened to the flow collar 36 at its lower end in a known manner to impart translational movement to the flow collar 36 for opening and closing the valve 10. Key member 65, positioned between the stem 60 and the bonnet 56, prevents rotational movement of stem 60 within the bonnet 56, while permitting translational movement to be imparted to the flow collar 36. The upward movement of the stem 60, and thus the flow collar 36, is limited when stem shoulder 70 contacts the stem nut 68. Alternate stem stop mechanisms may be used to limit upward stem movement to prevent fully uncovering the main flow ports 34, as described in U.S. Pat. No. 8,371,333, issued Feb. 12, 2013, to Bohaychuk. The bonnet 56 closes the upper end of the main bore 26. The bonnet is bolted to the valve body 12 through cap screws 74. Alternate mechanisms for closing the valve body 12, and for actuating the flow collar 36 for translational movement are well known in the art, such as hydraulic actuators and stepping actuators.

The particular valve shown in FIG. 1 is pressure balanced, including a cylindrical balance sleeve 75 sealed in the main bore 26 between the valve body 12 and the upstream end of the flow collar 39 with seal components 58, 76, and pinned at its ends with pins 77. One or more pairs of balance ports 78, for example four balance ports, extend through the end plate 38 and through the upstream end of the exterior collar 39 to a balance chamber 79 to reduce the stem load during opening and closing of the valve.

The choke valve 10 may optionally include inwardly extending protuberances to deflect flow toward the main flow ports 34 of the cage 32, as described in U.S. Pat. No. 7,426,938 and U.S. Pat. No. 6,105,614, both to Bohaychuk et al.

As shown in FIG. 2, the flow trim and stem/bonnet assembly may be positioned as an insert assembly wherein the flow trim 28 is held within a removable tubular cartridge 80 in the main bore for sub-sea applications, such as shown in prior art including U.S. Pat. No. 7,426,938 to Bohaychuk et al. or U.S. Pat. No. 4,540,022 to Cove. A prior art valve of this type is shown in FIG. 2, with like parts being labelled with similar reference numerals as used in FIG. 1.

The flow trim components including the cage 32 and the flow collar liner 37, including the end plate 38, are formed from hardened, wear resistant materials such as tungsten carbide materials or other hard, wear resistant ceramics.

While the tubular cage is shown in the Figures as having a generally constant diameter internal bore, it should be understood that the internal bore may be tapered or alternatively shaped in some applications.

Figure 3:
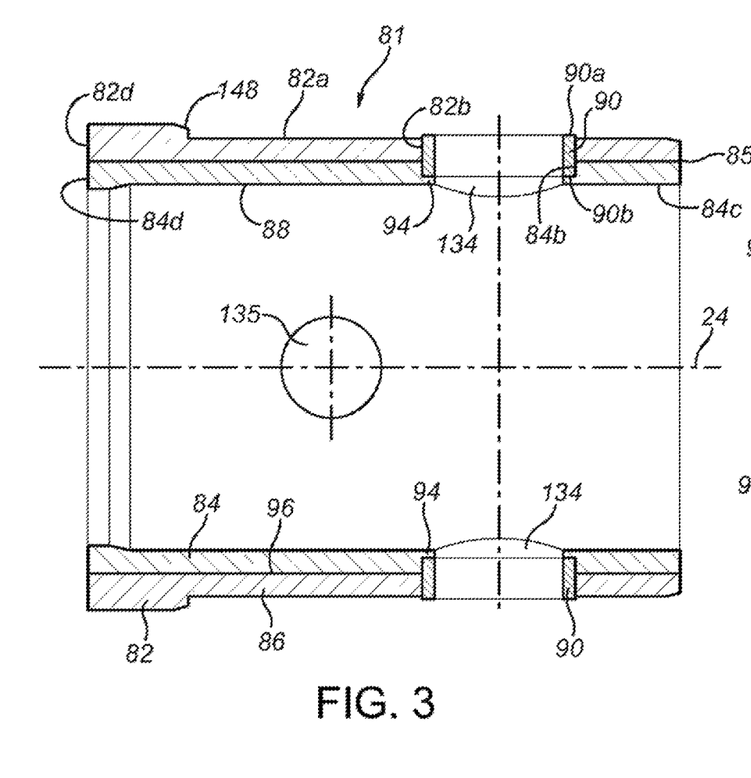
Figure 4:
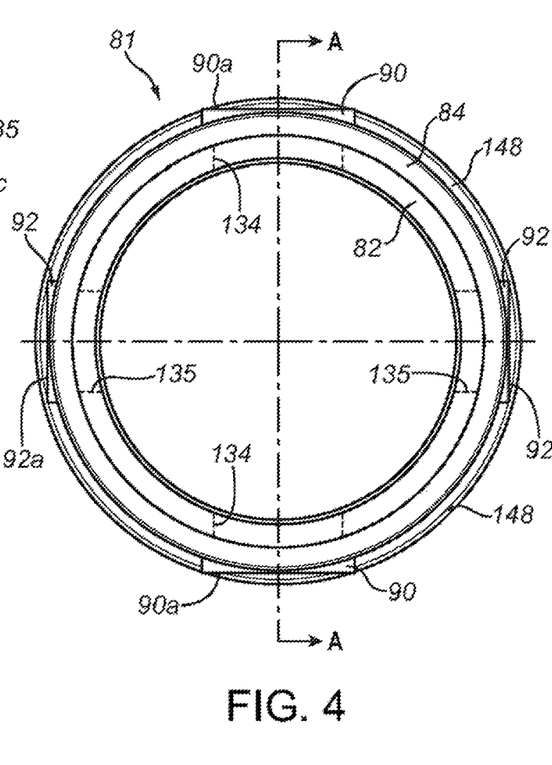
FIG. 4 is an end view of the tubular cage of FIG. 3, with a line A-A showing the section for the view of FIG. 3.

In FIGS. 3 and 4, the tubular cage component (for use in place of cage component 32 in either of the valves of FIG. 1 or 2) is shown generally as cage 81. Like or similar parts of the cage 81 of FIGS. 3 and 4 are labelled with the same reference numerals as used for FIGS. 1 and 2, or increased by 100.

The cage 81 is formed to include a tubular outer cage member 82 and a tubular inner cage member 84. The cage members 82, 84 may extend concentrically along the entire length of the cage as shown in FIG. 3, in which the members 82, 84 are co-extensive with each other. Alternatively, the cage members 82, 84 may be arranged such that one cage member is seated with the other cage member. In either arrangement (coextensive or seated), the cage members 82, 84 extend at least along the tubular ported portion 86 of the tubular cage 81, that is the tubular portion of the cage 81 in which the one or more flow ports are located, for example the one or more main flow ports 134, and the secondary flow ports 135 if included. This ported portion 86 experiences rapid wear during use at the port opening, and is prone to fracture as described above.

The outer and inner cage members 82, 84 are formed as close fitting sleeves or inserts, allowing one to slide over the other in close tolerance at the interface 85 between the cage members 82, 84, for example during a shrink fitting or press fitting operation. Alternatively, the outer and inner cage members may be joined by other techniques such as welding.

The inner cage members 84 is formed from hard, wear resistant materials such as tungsten carbide materials or hard, wear resistant ceramics, while the outer cage member 82 is formed from a metal material such as steel, stainless steel or a metal alloy such as an Inconel™ alloy. Inconel alloys are austenite nickel-chromium based alloys having high oxidation and corrosion resistance for extreme environments of pressure and temperature. By forming the cage members 82, 84 separately, and then fitting together by press fitting or shrink fitting, it is possible to form the two cage members from different hardness materials and/or with different thicknesses. One exemplary embodiment includes forming the outer cage member 82 from a fracture resistant steel material such as stainless steel, and forming the inner cage member 84 from a hard tungsten carbide grade, for example an Ra 88 or greater tungsten carbide, such as an Ra 88-94 grade tungsten carbide. A preferred tungsten carbide material is 5CB™, which is a tungsten carbide material with a micrograin 5% composite binder available from Master Flo Valve Inc. The 5CB tungsten carbide material combines erosion and corrosion resistance with toughness for choke valve flow trim applications. The outer steel cage component 82 greatly reduces catastrophic failure of the flow trim due to fracturing, while the inner cage member 84 provides erosion resistance internal of the cage 81.

As mentioned above, for choke valves of the external sleeve inner cage design, wear is found to be extreme at the port areas between the external sleeve and the internal cage. By forming the outer cage member of a metal material such as stainless steel, erosion of the stainless steel at the port openings for ports 134, 135, is accelerated compared to port wear for a port in a tungsten carbide member, such as is used for the tungsten carbide inner cage member 84, since stainless steel is a much softer metal. To address this accelerated erosion of the stainless steel at the ports 134, 135, wear inserts are provided, for example by press or shrink fitting, or by brazing, welding, or use of cements or adhesives. The wear inserts are provided at least in the main flow ports 134, and preferably also in the secondary flow ports 135, if present. In FIGS. 3 and 4, the wear inserts for the main flow ports 134 are shown to include cylindrical main port sleeves 90, while the wear inserts for the secondary flow ports 135 are shown to include cylindrical secondary port sleeves 92. The port sleeves 90, 92 are formed of a hard, wear resistant material such as tungsten carbide or hard ceramics, with 5CB tungsten carbide being a preferred material.

Within each of the ports 134, the port sleeve 90 extends from the outer wall 82a of the outer cage member 82, across the thickness of the port wall 82b at the port opening 134 of the outer cage member 82, across the interface 85 between the outer and inner cage members 82, 84, and across a portion of the thickness of the port wall 84b at the port opening 134 of the inner cage member 84. The port sleeve 90 seats on a shoulder seat 94 formed in the inner cage member 84 at the opening of port 134 into the inner bore 88. The shoulder seat 94 extends inwardly into the port 134, and is formed when forming the port 134 in the inner cage member, for example by machining the port 134 as a counterbore in the inner cage member 84. Similarly, for the ports 135, the port sleeve 92 extends from the outer wall 82a of the outer cage member 82, across the thickness of the port wall 82b at the port opening 135 of the outer cage member 82, across the interface 85 between the outer and inner cage members 82, 84, and across a portion of the thickness of the port wall 84b at the port opening 135 of the inner cage member 84 to seat on a shoulder seat 94 formed in the inner cage member 84 at the port opening 135.

Figure 5:
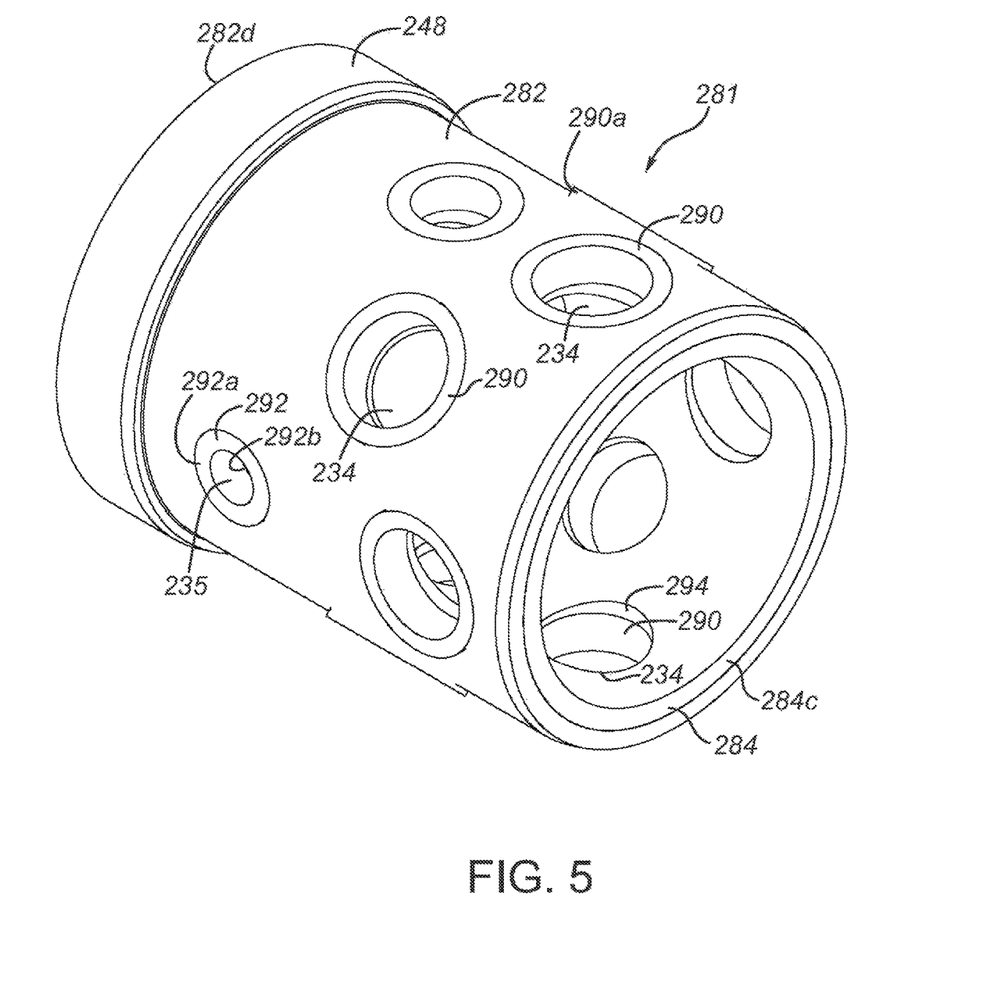
FIG. 5 is a perspective view of a multi-port embodiment of a tubular cage component of the flow trim adapted for use in either of the choke valves of FIG. 1 or 2, wherein a plurality of main flow ports are circumferentially arranged in the ported portion, together with a pair of smaller diameter, diametrically opposed secondary flow ports. Each of main and secondary flow ports are shrink fitted with a port insert which includes a seated port sleeve of a hardened, wear resistant material such as tungsten carbide.
Figure 6:
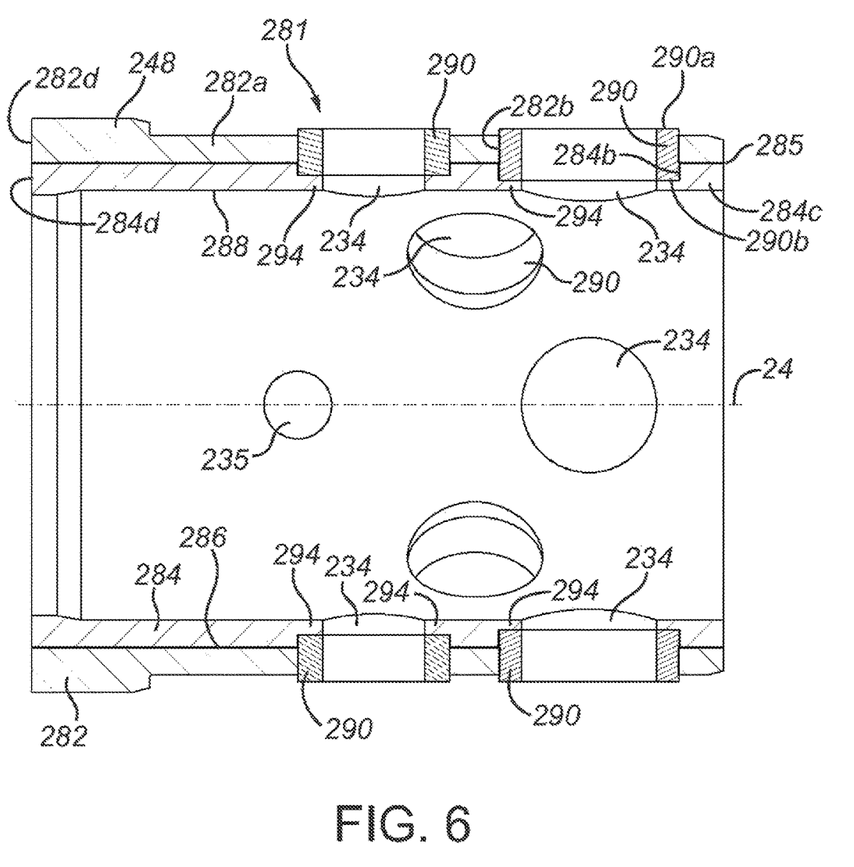
FIG. 6 is a side sectional view of the tubular cage of FIG. 5.
Figure 7:
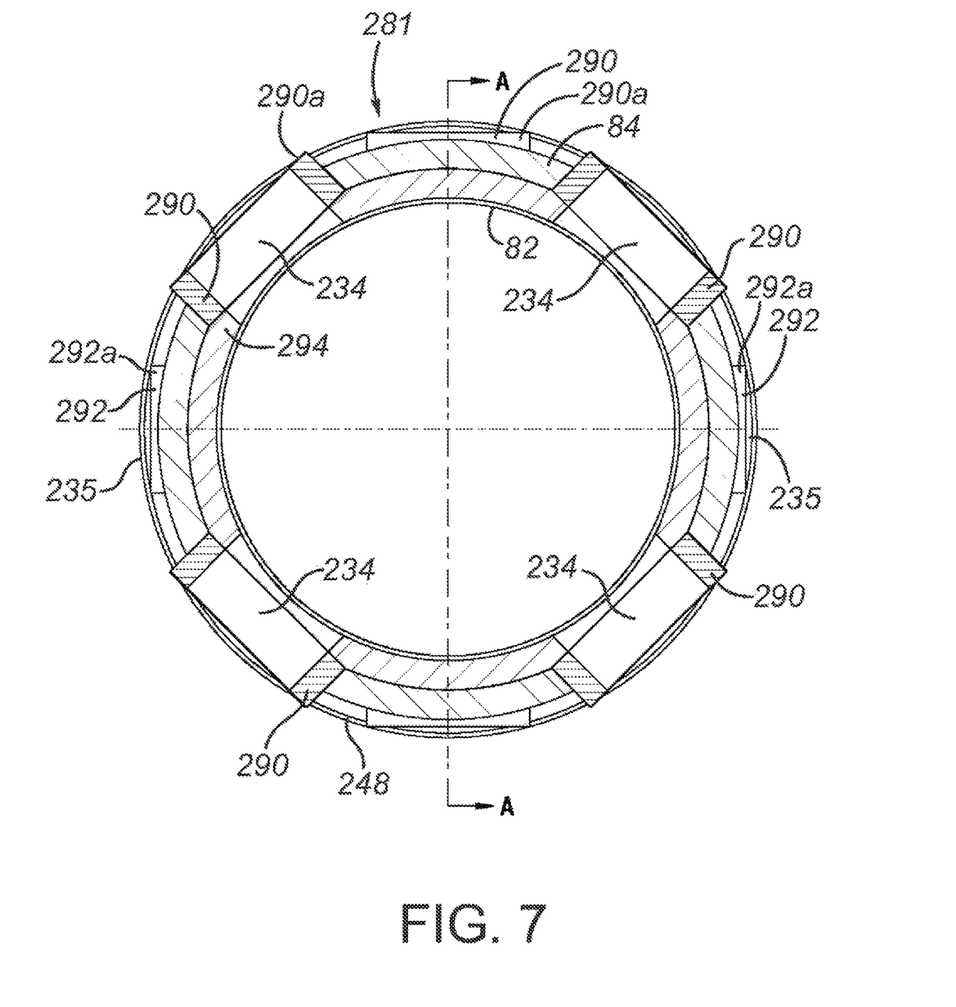
FIG. 7 is a sectional view perpendicular to the long axis of the tubular cage of FIG. 5, cutting through four of the main flow ports, with a line A-A showing the section for the view of FIG. 6.
Figure 8:
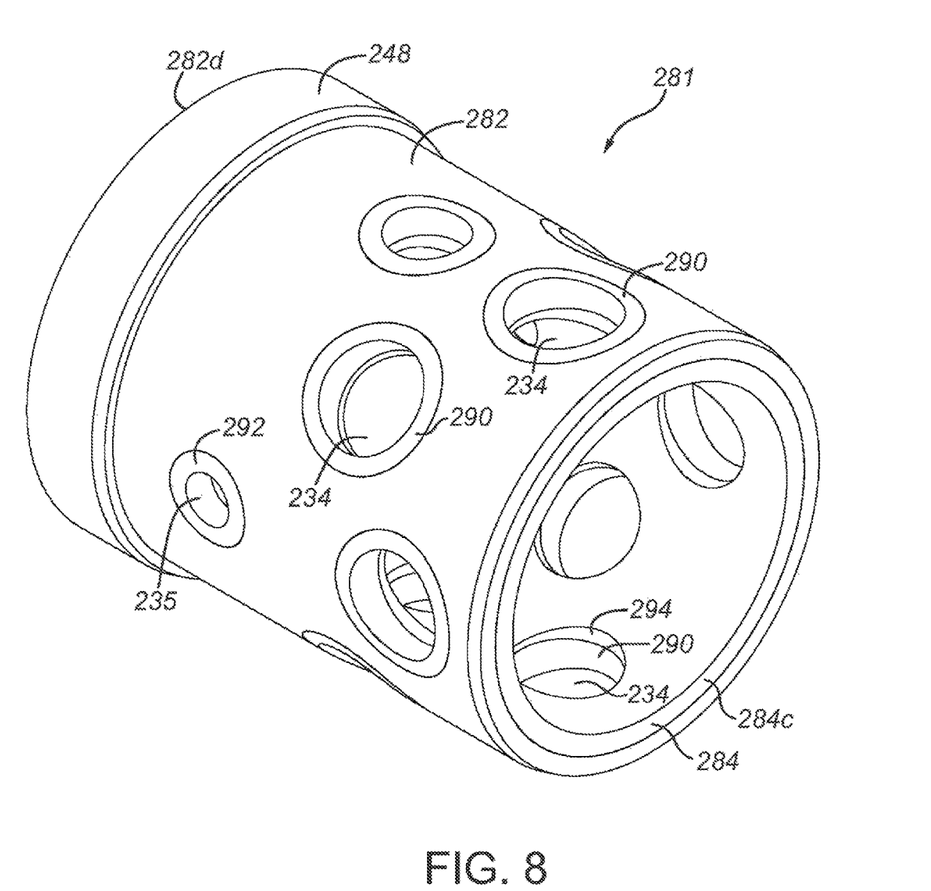
FIG. 8 is a perspective view of the tubular cage of FIG. 5 after a final grinding step on the outer wall of the tubular cage to remove protruding portions of the port sleeves in each of the main and secondary flow ports.
Figure 9:
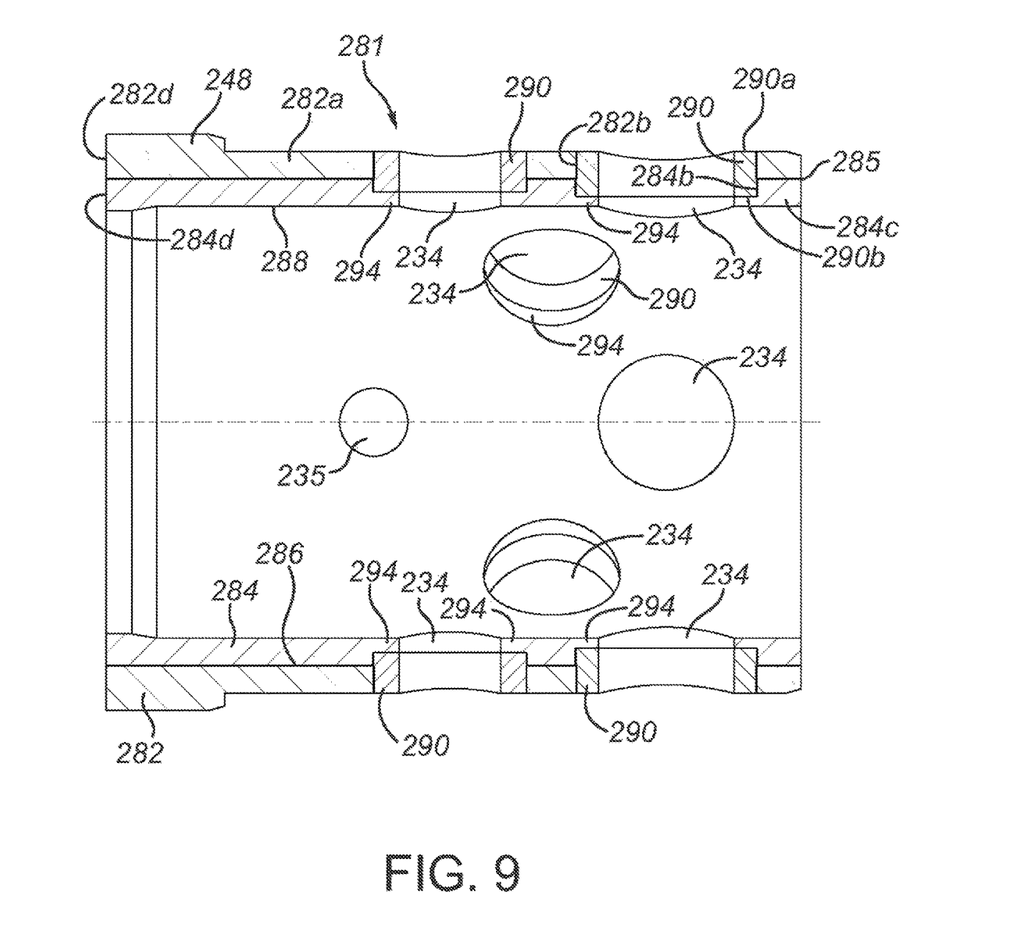
FIG. 9 is a side sectional view of the tubular cage of FIG. 8.
Figure 10:
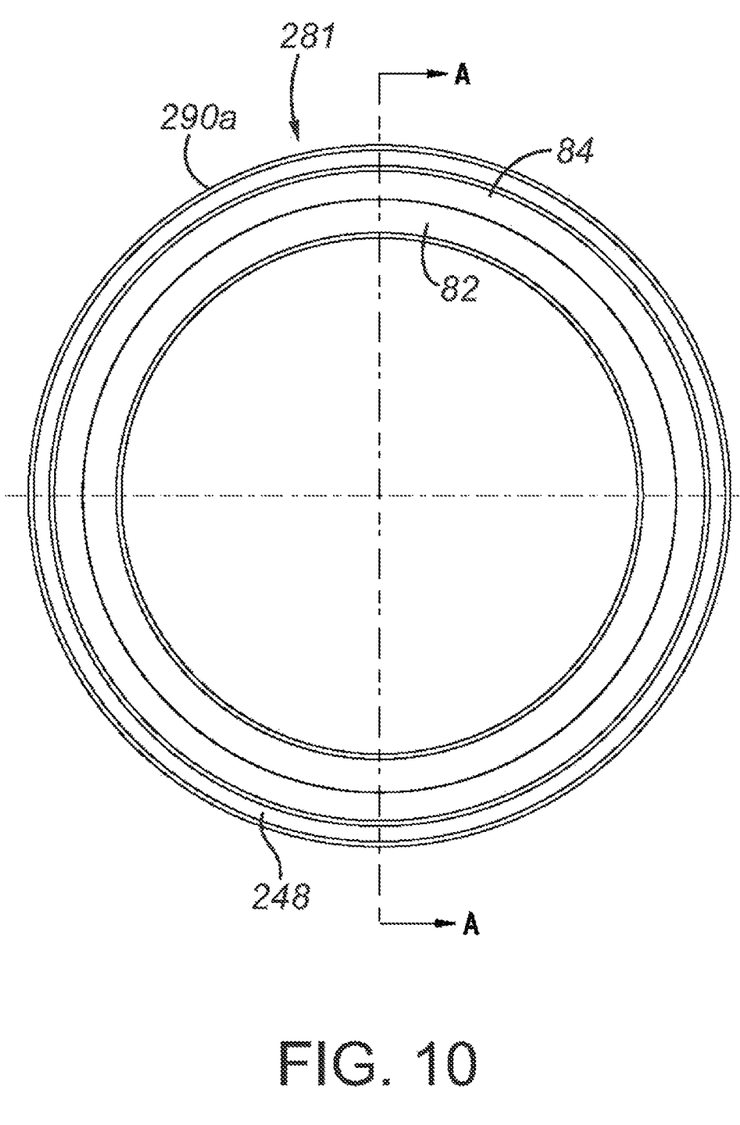
FIG. 10 is an end view of the tubular cage of FIG. 8, with a line A-A showing the section for the view of FIG. 9.

FIGS. 3 and 4 show the main flow ports 134 as a pair of diametrically opposed ports, with the secondary flow ports 135 arranged as a pair of smaller diametrically opposed ports axially rotated 90° (as for the cage valves shown in FIGS. 1 and 2). However, the cage component may be formed as a multi-port cage component, such as shown in FIGS. 5 to 10, with reference numerals for the components which are similar to components of FIGS. 3 and 4 having like reference numerals, but increased by 100. In FIGS. 5 to 10, the multi-port cage component 281 is shown to be formed with a plurality of main flow ports 234 circumferentially spaced in the ported portion 286, and with a pair of smaller diameter, diametrically opposed secondary ports 235 in the ported portion 286 more proximate the outlet end 284d of the cage component 281. The cage component 281 is formed with an outer metal cage member 282, as described above for outer cage member 82, and an inner wear resistant cage member 284 as described above for inner cage member 284. The inner cage member 284 forms a shoulder seat 294, as described above shoulder seat 94, at least in each of the main flow ports 234, and preferably also in the secondary flow ports 235. Port sleeves 290, formed of a hard, wear resistant material such as tungsten carbide or a hard ceramic, are seated in each of the main flow ports 234, as described above for port sleeves 90, with the inner end 290b of the port sleeve 290 seated against the shoulder seat 294. Preferably wear resistant port sleeves 292 are also seated in each of the secondary flow ports 235, as described above for port sleeves 92, with the inner end 292b seated on the shoulder seat 294. FIGS. 5 to 7 show the cage component 281 after the port sleeves 290, 292 are seated, while FIGS. 8 to 10 show the cage component 281 after the protruding outer ends 290a, 292a of the port sleeves 290, 292 have been ground to be flush with the outer wall 282 of the outer cage component 282.

Fabrication of the tubular cage component will be described for cage component 81, since fabrication is similar for a single flow port or a multi-port cage component. The inner tubular cage 84 is formed from a tubular tungsten carbide member, and is machined to include the inner bore 88 between its respective end portions 84c, 84d (end portion 84d being the outlet end adapted to be most proximate the outlet bore 22). The outer tubular cage member 82 is formed from a metal material such as stainless steel to include an inner bore 96 which is sized to accommodate the OD of the inner cage component 84 for press or shrink fitting therein, or alternatively for welding together. The outlet end 82d of the outer cage member 82 is formed with a widened retaining shoulder 148 to retain the cage component in the main bore 26 of the valve. Main and secondary ports 134, 135 are machined through the respective side walls of the outer and inner cage members 82, 84 in a manner such that the ports 134, 135 of each cage member 82, 84 are aligned once they are joined by press or shrink fitting or by welding. The ports 134, 135 of inner cage member 84 are machined as a counterbore to leave the shoulder seat 94 extending inwardly into the ports 134, 135 at the port openings to the inner bore 88. For shrink fitting, the outer cage member 82 is heated to expand the metal, and the inner cage member 84 is inserted into the outer cage member, ensuring that the ports 134, 135 are aligned. The outer and inner cage members may alternatively be press fitted or welded.

The port sleeves 90, 92 may be press or shrink fitted into the ports 134, 135, or they may be welded or brazed in place. For instance, the port sleeves 90, 92 are cooled, for example in liquid nitrogen, and are pressed into the ports 134, 135 respectively, to seat against the shoulder seats 94 of the inner cage member. Alternatively, the port sleeves may be welded or brazed against the port walls 82b, 84b at the port openings 134, 135, and against the shoulder seats 94. Still alternatively, the port sleeves may be held to the port walls 82b, 84b at the port openings 134, 135, and against the shoulder seats 94 with a cement or adhesive. For high temperature applications, a high temperature cement or adhesive, such as a multi-component epoxy adhesive may be used, however, in general, press or shrink fitting, welding or brazing are preferred for high temperature applications. A final grind on the OD of the outer cage member 82 is performed to remove protruding portions at the outer ends 90a, 92a of the port sleeves 90, 92 extending beyond the outer wall 82a at the ports (as are visible in FIG. 4).

While the tubular cage 81 is shown in FIGS. 3 and 4 as having a generally constant diameter inner bore 88, it should be understood that the inner bore of the inner cage member 84 may be tapered or alternatively shaped in some applications.

All references mentioned in this specification are indicative of the level of skill in the art of this invention. All references are herein incorporated by reference in their entirety to the same extent as if each reference was specifically and individually indicated to be incorporated by reference. However, if any inconsistency arises between a cited reference and the present disclosure, the present disclosure takes precedence. Some references provided herein are incorporated by reference herein to provide details concerning the state of the art prior to the filing of this application, other references may be cited to provide additional or alternative device elements, additional or alternative materials, additional or alternative methods of analysis or application of the invention.

The terms and expressions used are, unless otherwise defined herein, used as terms of description and not limitation. There is no intention, in using such terms and expressions, of excluding equivalents of the features illustrated and described, it being recognized that the scope of the invention is defined and limited only by the claims which follow. Although the description herein contains many specifics, these should not be construed as limiting the scope of the invention, but as merely providing illustrations of some of the embodiments of the invention.

One of ordinary skill in the art will appreciate that elements and materials other than those specifically exemplified can be employed in the practice of the invention without resort to undue experimentation. All art-known functional equivalents, of any such elements and materials are intended to be included in this invention. The invention illustratively described herein suitably may be practised in the absence of any element or elements, limitation or limitations which is not specifically disclosed herein.

The invention claimed is:

1. A valve having a fluid flow path extending therethrough which is to be restricted or closed, comprising:
   a hollow valve body assembly having an inlet bore and an outlet bore substantially at right angles and a main bore which is an extension of the outlet bore and which communicates with the inlet bore;
   a flow trim positioned in the main bore, the flow trim comprising a stationary tubular cage having a side wall, and an external cylindrical flow collar adapted for sliding movement along the side wall of the cage, the side wall of the cage forming an internal bore aligned with the outlet bore and having a ported portion between its ends formed with one or more flow ports, the external flow collar being adapted for movement between a closed position, wherein the one or more flow ports are fully covered by the external flow collar, and an open position, wherein each of the flow ports is fully or partially uncovered by the external flow collar, whereby fluid may enter the valve through the inlet bore, pass through the one or more flow ports at reduced pressure and continue through the outlet bore;
   a bonnet disengagably connected with, and closing, an upper end of the valve body;
   a stem for biasing the external flow collar over the one or more flow ports;
   the tubular cage being formed such that at least the ported portion includes a tubular outer cage member formed from a metal material and a tubular inner cage member formed from a wear resistant material, the inner cage member and the outer cage member being concentrically aligned, having a length to span at least the ported portion;
   some or all of the one or more flow ports including a port insert comprising a port sleeve formed from a wear resistant material such that the port sleeve extends at least over the metal material of the outer cage member and across an interface between the inner cage member and the outer cage member at the one or more flow ports;

wherein the port sleeve is seated against a seat shoulder extending into the one or more flow ports and formed by the inner cage member at the port opening into an inner bore of the inner cage member.

2. The valve of claim 1, wherein the port sleeve is press or shrink fitted in the one or more flow ports, or is brazed or welded in the one or more flow ports, or is held in the one or more flow ports with a cement or adhesive.

3. The valve of claim 2, wherein the inner cage member and the outer cage member are coextensive along their entire lengths and are joined together by press or shrink fitting, or by welding.

4. The valve of claim 3, wherein the one or more flow ports are arranged to include one or more pairs of diametrically opposed main flow ports.

5. The valve of claim 4, further comprising:
at least one pair of diametrically opposed secondary flow ports formed in the side wall of the cage, the secondary flow ports having a smaller diameter than a diameter of the main flow ports, and each pair of secondary flow ports being positioned with an axis which is offset by 90° from the axis of one of the pairs of main flow ports and closer to the outlet bore than are the main flow ports.

6. The valve of claim 3, wherein there is one pair of diametrically opposed main flow ports.

7. The valve of claim 3, wherein the one or more flow ports are arranged as a plurality of circumferentially main flow ports in the ported portion.

8. The valve of claim 3, further comprising:
at least one pair of diametrically opposed secondary flow ports formed in the side wall of the cage, the secondary flow ports having a smaller diameter than a diameter of the main flow ports and being positioned closer to the outlet bore than are the main flow ports.

9. The valve of claim 8, wherein each of the secondary flow ports includes a port insert comprising a port sleeve formed from a wear resistant ceramic material such that the port sleeve extends at least across the metal material of the outer cage member and across the interface between the inner cage member and the outer cage member at the secondary flow port.

10. The valve of claim 9, wherein the port sleeve in the secondary flow port is seated against a seat shoulder extending into the secondary flow port and formed by the inner cage member at the port opening into an inner bore of the inner cage member, and wherein the port sleeve is press or shrink fitted into the secondary flow port, or is brazed or welded in the secondary flow port, or is held with a cement or an adhesive into the secondary flow port.

11. The valve of claim 2, wherein the inner cage member and the port sleeves are formed from a tungsten carbide material or a hard ceramic material, and the outer cage member is formed from steel, stainless steel or a metal alloy.

12. The valve of claim 2, wherein the inner cage member and the port sleeves are formed from a tungsten carbide material, and the outer cage member is formed from stainless steel.

13. The valve of claim 1, wherein the inner cage member and the port sleeves are formed from a tungsten carbide material or a hard ceramic material, and the outer cage member is formed from steel, stainless steel or a metal alloy.

14. The valve of claim 1, wherein the inner cage member and the port sleeves are formed from a tungsten carbide material, and the outer cage member is formed from stainless steel.

15. The tubular cage as defined in claim 1.

* * * * *